United States Patent [19]
Swenson et al.

[11] Patent Number: 5,885,628
[45] Date of Patent: Mar. 23, 1999

[54] INJECTION MOLDING NOZZLE

[75] Inventors: Paul M. Swenson, South Hamilton; Michael L. Vasapoli, Gloucester; William J. Hume, West Newbury, all of Mass.

[73] Assignee: Dynisco, Inc., Sharon, Mass.

[21] Appl. No.: 856,260

[22] Filed: May 14, 1997

Related U.S. Application Data

[63] Continuation of Ser. No. 628,535, Apr. 10, 1996, abandoned, which is a continuation-in-part of Ser. No. 367,779, Dec. 30, 1994, Pat. No. 5,554,395, which is a continuation of Ser. No. 105,799, Aug. 12, 1993, abandoned.

[51] Int. Cl.[6] .................................................. B29C 45/20
[52] U.S. Cl. .................... 425/549; 264/328.15; 425/570; 425/572
[58] Field of Search ................................ 425/549, 570, 425/571, 572; 264/328.15

[56] References Cited

U.S. PATENT DOCUMENTS

| | | |
|---|---|---|
| 4,034,952 | 7/1977 | Stewart . |
| 4,088,271 | 5/1978 | Flygenring . |
| 4,212,626 | 7/1980 | Gellert . |
| 4,344,750 | 8/1982 | Gellert . |
| 4,530,654 | 7/1985 | Rose . |
| 4,705,473 | 11/1987 | Schmidt . |
| 4,726,751 | 2/1988 | Shibata . |
| 4,832,593 | 5/1989 | Brown . |
| 4,900,560 | 2/1990 | Trakas . |
| 4,925,384 | 5/1990 | Manner . |
| 4,981,431 | 1/1991 | Schmidt . |
| 5,118,279 | 6/1992 | Gellert . |
| 5,135,377 | 8/1992 | Gellert . |
| 5,139,724 | 8/1992 | Hofstetter et al. . |
| 5,208,052 | 5/1993 | Schmidt et al. . |
| 5,254,305 | 10/1993 | Fernandez et al. . |
| 5,268,184 | 12/1993 | Gellert . |
| 5,269,676 | 12/1993 | Gellert . |
| 5,299,928 | 4/1994 | Gellert . |
| 5,318,434 | 6/1994 | Gellert . |
| 5,324,191 | 6/1994 | Schmidt . |
| 5,326,251 | 7/1994 | Gellert . |
| 5,334,008 | 8/1994 | Gellert . |
| 5,346,388 | 9/1994 | Gellert . |
| 5,443,381 | 8/1995 | Gellert . |
| 5,492,467 | 2/1996 | Hume et al. . |
| 5,545,028 | 8/1996 | Hume et al. . |
| 5,554,395 | 9/1996 | Hume et al. ............................. 425/549 |
| 5,674,439 | 10/1997 | Hume et al. . |

OTHER PUBLICATIONS

2 Sheets of Drawings—Product of Kona Corporation—Feb. 27, 1987.
Machines, Processing and Application, W. Hartmann, pp. 9–15.
"Thermoplay®"—Directly Heated Thermoconducting Nozzle with Universal Applications, W. Hartmann, pp. 1–8.
Optimization of Thermal Economy from Hot Channel Nozzles, R. Löhl, pp. 1–8.
An account of activity by Kona corporation including sketches by P.Swenson, dated Aug. 25, 1994 & Mar. 15, 1995.
Thermoplay Nozzles for hot runner—Enrietti System.

*Primary Examiner*—Tim Heitbrink
*Attorney, Agent, or Firm*—Wolf, Greenfield & Sacks, P.C.

[57] ABSTRACT

An injection molding nozzle for disposition in a mold. The nozzle is for injecting melt into a cavity of the mold, and includes a body having a through bore extending therethrough for receiving the melt. Attached to the body of the nozzle is a nozzle piece secured to the body that defines an outlet communicating between the body through bore and the cavity gate. A nozzle member surrounds the body at a position upstream of the nozzle piece and has an inner surface contacting the body, and an outer surface contacting the mold. The outer surface forms a seal against melt flow upstream from the nozzle member.

62 Claims, 5 Drawing Sheets

INJECTION MOLDING NOZZLE

This application is a continuation of U.S. Ser. No. 08/628,535 filed Apr. 10, 1996, now abandoned, which in turn is a continuation-in-part of U.S. Ser. No. 08/367,779, filed Dec. 30, 1994, now U.S. Pat. No. 5,554,395, issued Sep. 10, 1996, which in turn is a continuation of Ser. No. 08/105,799, filed Aug. 12,1993, now abandoned.

BACKGROUND OF THE INVENTION

1. Field of the Invention

The present invention relates in general to nozzles for use in an injection molding system. More particularly, the present invention relates to an improved injection molding nozzle characterized in particular by minimal heat loss characteristics and an improved sealing technique.

2. Discussion of the Related Art

A common problem in the field of injection molding is the need to keep the melt that forms the molded article at a uniform temperature as it passes from a plastic melt source through an injection nozzle and into a cavity in the cooled mold. The melt is uniformly kept at its optimum melting point in order to assure a good melt flow. The optimum temperature is the temperature at which no melt freeze-off or burning occurs.

Usually, a bore is formed in the cooled mold in which the nozzle is seated. The mold is often several times cooler than the melt, thus, in order to keep the melt at its optimum flowing temperature, the nozzle is heated by heating coils, heat pipes, electric resistance heaters, or other appropriate heating means. As the nozzle is surrounded by the cooled mold, significant heat loss can occur between the nozzle and the mold which can affect the temperature of the melt. Further, the heat transfer from the nozzle to the mold can affect the solidifying times of the molded article in the cavity within the mold. Accordingly, there is a need to provide effective insulation of the nozzle within the mold to minimize heat loss from the nozzle to the mold.

In view of the foregoing, it is an object of the present invention to provide improved insulation of a nozzle for an injection molding machine, in order to minimize heat loss that occurs from the heated nozzle to the cooled mold.

Another object of the present invention is to provide an improved nozzle seal that provides, not only the aforementioned heat insulation characteristics, but also a simple and effective seal against melt leakage from the gate.

SUMMARY OF THE INVENTION

The present invention relates to an injection molding nozzle that is adapted to be disposed in a mold. The nozzle is for injecting melt into a cavity of the mold. The nozzle comprises a body including a main section having a through bore extending through the body and for the introduction of the melt. A nozzle piece is disposed at the end of the body. The nozzle piece is secured to the body and defines an outlet communicating between the through bore of the body and the cavity gate. A nozzle member is provided for the purpose of sealing against melt flow as well as for providing thermal insulation between the nozzle body and the mold. The nozzle member surrounds the body at a position upstream of the nozzle piece, has an inner surface contacting the body, and an outer surface contacting the mold. The outer contacting surface forms a seal preventing melt flow about the nozzle body.

In one preferred embodiment of the present invention disclosed herein, the nozzle member is an annular member constructed of a heat insulating material and has a length measured in the direction of melt flow through the through bore that is greater than the width of the annular nozzle member. The nozzle member also preferably defines air gaps on either side thereof between the nozzle member and the respective nozzle body and mold. In the embodiment disclosed herein, the nozzle member also includes a separately disposed annular seal formed in a cavity of the annular nozzle member.

Other embodiments of the present invention described herein include an embodiment in which the nozzle piece is arranged to extend radially of the longitudinal through bore in the body main section. A single nozzle piece can be employed or, in other embodiments, multiple nozzle pieces are described arranged in a radial pattern.

In accordance with another aspect of the present invention, the nozzle piece is constructed to include an outer piece of annular construction and disposed about the outlet of the nozzle piece and similarly about the cavity gate. This outer piece does not form a seal to the melt but instead is disposed with a small gap so as to provide further heat insulation characteristics.

DETAILED DESCRIPTION

Figure 1:
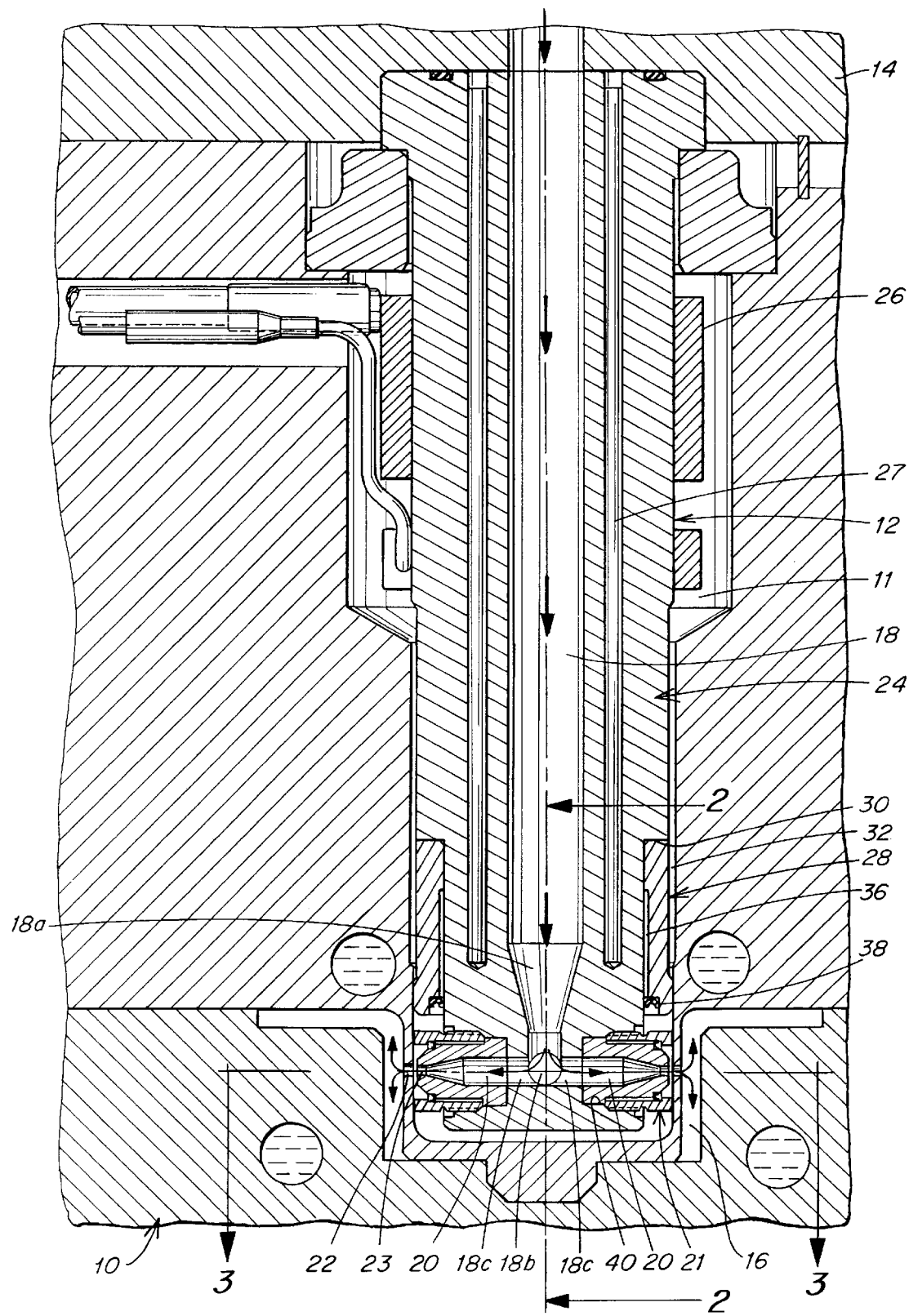
FIG. 1 is a cross-section view of the injection nozzle according to one embodiment of the present invention.

The present invention relates to a nozzle for use in an injection molding system. FIG. 1 shows a cutaway of an injection mold system used to form molded articles. The system shown utilizes one embodiment of a nozzle 12 according the present invention. The system includes three main parts, a cooled mold 10, the nozzle 12, and a heated manifold 14. Note, the heated manifold can be used when multiple nozzles are used. In an alternate embodiment, when a single nozzle, also called a sprue bushing is used, the nozzle 12 can be directly connected to the injection machine, eliminating the need for the manifold. The cooled mold has a bore 11 in which nozzle 12 is heated. The molded article is formed in a cavity 16 formed within mold 10. To form the molded article, hot melt is injected under pressure from an injection machine (not shown) into heated manifold 14 (if used), through a bore 18 within the nozzle 12. The melt flows through the bore 18, to a section of the bore that narrows 18a. The vertical section of bore 18 ends at 18b and is distributed to radial passages 18c. Radial passages 18c lead into recesses 40 which receive nozzle pieces 21. Nozzle pieces 21 have bore passages 20 through which the melt passes, as indicated by the arrows. The melt exits the radial bore passages 20 at opening 23 of nozzle piece 21, and flows into the cavity 16 via a gate 22 of the cavity. The cooled mold 10 causes the melt material which is injected into the cavity to solidify. The molded article when solidified is then ejected from the mold. The nozzle 12 includes a nozzle body 24 which preferably is kept at the temperature of the melt through the use of resistance heaters 26 and heat pipes 27, or other appropriate heating means. The nozzle body can be made of stainless steel, 4140 tool steel, or other appropriate material. The bore 11 in the mold has an increased diameter for accommodating resistance heaters 26. Alternatively, the resistance heaters can be embedded in the nozzle, in which case the bore 11 would have a uniform diameter.

Figure 2:
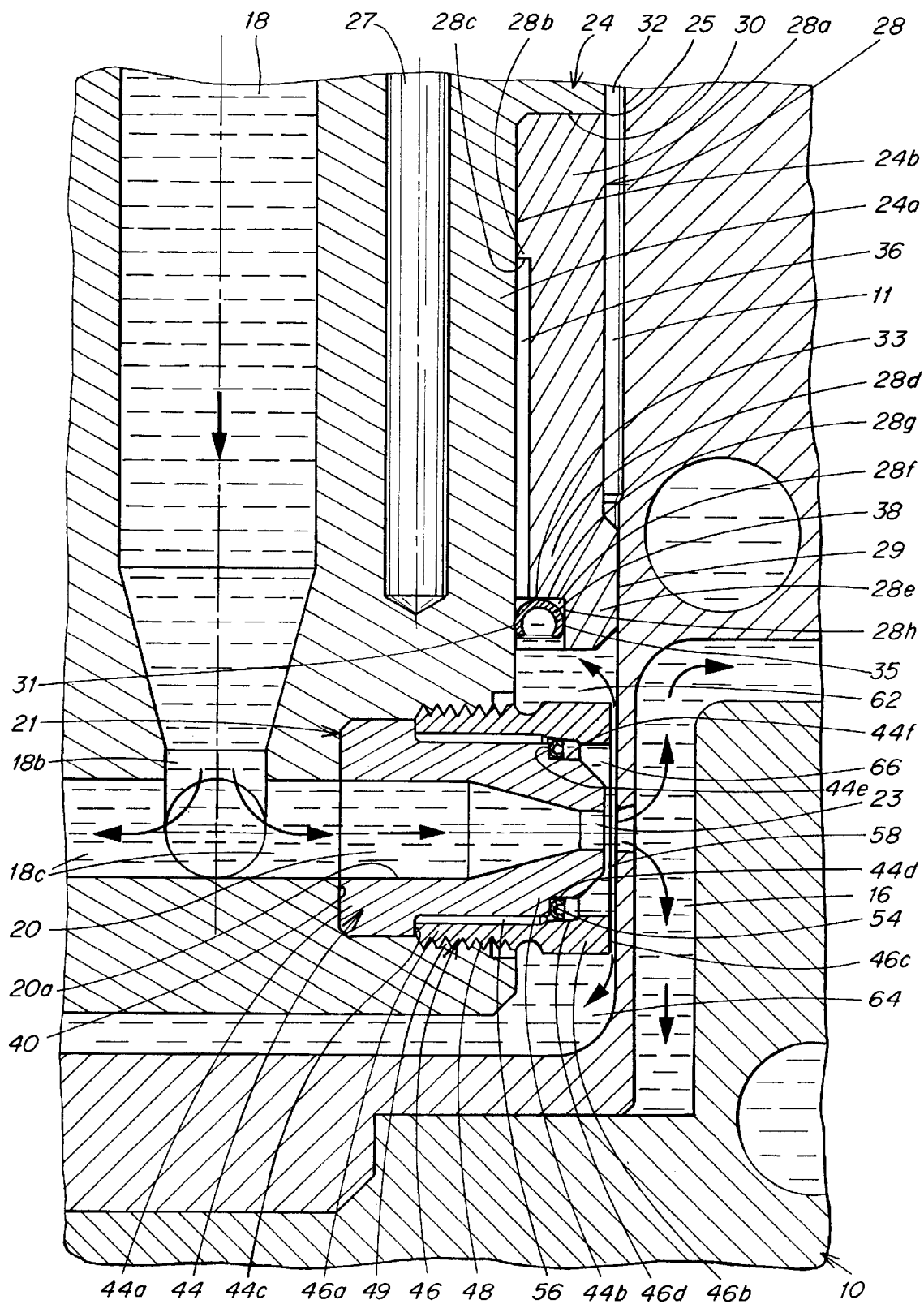
FIG. 2 is an enlarged fragmentary view of a portion of the nozzle showing greater details of the nozzle construction, as taken along line 2—2 of FIG. 1.

Referring to FIG. 2, which is an enlarged fragmentary view of a portion of the nozzle 12 showing greater details of the nozzle construction, as taken along lines 2—2 of FIG. 1, the nozzle body has a section of reduced diameter 24a that defines a shoulder 30. Nozzle member 28 is a sealing sleeve fixedly attached to the nozzle body 24 at shoulder 30 and at a surface 24b of reduced diameter section 24a. The nozzle member 28 has a top portion 28a that is fixedly attached to shoulder 30 and to surface 24b of reduced diameter section 24a. The nozzle member can be fixedly attached by press fitting it about the nozzle body. In an alternate embodiment, the nozzle member can have a threaded top portion for screwing it on the nozzle body. The top portion 28a includes a flange 28b defining a shoulder 28c, the inner surface of flange 28b being attached to surface 24b of reduced diameter section 24a. The nozzle member is constructed so that its outer surface is flush with the nozzle body 24 to create a smooth surface 25 where the nozzle member 28 meets the nozzle body 24. The radius of nozzle body 24 and nozzle member 28 measured from the center of bore 18 is less than the radius of the inner surface of the mold bore 11; thus, an insulating air gap 32 is formed between them. The nozzle member 28 has a lower portion 28d that contacts mold 10 to form a seal 29 which seals the air gap 32. Lower portion 28d of nozzle member 28 has a flange 28e which extends away from nozzle body 24, so as to engage the mold to form the seal 29. The seal 29 formed between the mold 10 and the nozzle member 28 by flange 28e functions to prevent melt from escape in to air gap 32. The air gap 32 also functions to insulate the nozzle from the mold. Note, flange 28e also serves to align the nozzle 12 within the mold bore 11.

The nozzle member 28 can be made of a material having a low thermal conductivity, such as titanium alloy, in order to insulate the nozzle from the cooled mold. Due to the elongated construction of the nozzle member 28, heat loss from where the nozzle body contacts the nozzle member (shoulder 30 and surface 24b of the nozzle body) to the cooled mold 10 at seal 29 is minimized, as any heat transfer must proceed from upper portion 28a of the nozzle member, down the entire length of the nozzle member 28 to the lower portion 28d and flange 28e where seal 29 is formed.

The nozzle member 28 also includes a recess 28f which defines a shoulder 28g and an inner surface 28h located in lower portion 28d that faces section 24a of nozzle body 24. The recess 28f is for receiving a seal 38. The seal 38 extends in a ring around the nozzle body 24. In the embodiment shown in FIGS. 1 and 2 the seal is formed in a C-shape. The C-shape minimizes the contact area the seal makes with the nozzle body 24 at contact point 31, and the shoulder 28g and inner surface 28h at contact points 33 and 35, respectively. Any shape seal may be used which creates minimal contact points with the nozzle body 24 and the nozzle member 28. Minimizing the area of the contact points of the seal minimizes the heat transfer which may pass from the nozzle body 24 through the seal to the lower portion 28d of the nozzle member 28 through seal 29 to the mold 10. A second insulating air gap 36, providing further insulation to nozzle body 24, is defined by the nozzle body 24, the nozzle member 28, and seal 38 which prevents melt from escaping into air gap 36. Due to the poor heat transfer characteristics of the seal 38 to the mold, and the elongated construction of the nozzle member 28, heat loss to the mold is minimized, and the melt can be kept at its optimum temperature. To further reduce heat loss, the seal 38 can be made of a thin, resilient metallic substance having low thermal conductivity. Further, resiliency of the seal 38 enables it to be compressibly fit around nozzle body 24, and permits nozzle member 28 to compress the seal inward toward the nozzle to create a good seal.

Still referring to FIG. 2, the nozzle piece 21 will now be described. The nozzle body 24 includes a cup-shaped recess 40 for receiving the nozzle piece 21 having bore passage 20 formed therein. Nozzle piece 21 includes an inner piece 44 which is seated in recess 40 of body 24 of nozzle 12, and an outer piece 46 which surrounds a portion of the inner piece and holds the inner piece in place. The diameter of bore passage 20 formed in inner piece 44 is formed to be the same as the diameter of radial passages 18c of the nozzle body 24. Thus, the inner surface 20a of the bore passage 20 is flush with the inner surface of radial passage 18c. The inner piece includes a first section 44a that is seated in recess 40. A second section 44b has a lesser diameter than the first section 44a. A shoulder 44c is defined where the first and second sections meet. The outer piece 46 has a first end 46a that is seated on the shoulder 44c of the inner piece. The first end 46a has threads 48 adapted to mate with threads 49 formed in the recess 40. The second end 46b of the outer piece includes a section 46c which extends toward the surface of the mold 10.

The inner piece can be constructed of a highly thermally conductive material, such as beryllium copper, in order to maintain the temperature of the melt which passes through opening 23 of inner piece 44. Thus, the heat from the heated nozzle body 24 will conduct to the inner piece 44 to maintain the temperature of the melt passing through the inner piece. The outer piece 46 is preferably formed of a low thermally conductive material, such as titanium alloy, to minimize the heat transfer from the inner piece and the nozzle body 24 to the cooled mold. A seal 54, of similar shape as seal 38 yet having smaller dimensions, together with the inner and outer pieces of the nozzle piece 21 form an insulating air gap 56, which functions to insulate the thermally conductive inner piece 44. This construction minimizes heat loss which occurs from the inner piece 44 to the cooled mold, as although the outer piece 46 is quite close to the cooled mold, the shoulder 44c where the inner piece and outer piece contact one another is relatively far away from where the section 46c almost contacts the cooled mold. Thus, heat loss must travel from the shoulder 44c down the entire length of low thermally conducting piece outer piece 46 to be in proximity with the mold 10.

As stated above, seal 54 can be of a similar shape and material as seal 38. Seal 54 also performs similar functions as seal 38, as the C-shape minimizes contact areas between the inner and outer pieces, and consequently minimizes the heat loss from the inner piece 44 to the outer piece 46 via the seal 54. To accommodate the seal 54 the inner piece 44 includes an annular recess 44d in second section 44b. The annular recess 44d forms a shoulder 44e that contacts the seal 54. The seal 54 also has contact points along the inner surface 44f of recess 44d, and on an inner surface of the second end 46b of the outer piece. The inner surface of outer piece 46 tapers inward at 46d to the region that contacts the seal 54. To assemble the nozzle piece 21 in the recess 40, the seal is compressibly fit over the inner piece at annular recess 44d. Note, the seal 54, like the seal 38, can be made of a resilient material of low thermal conductivity. The inner piece 44 is then placed in recess 40. The outer piece 46 is then screwed in mating threads 48 of the outer piece with threads 49 of the nozzle body 24. When screwing in the outer piece, the inner surface of first end 46a passes freely over seal 54. However, when the outer piece is screwed in to the point where tapered section 46d, which is of a lesser diameter than the inner surface of the first end 46a, engages the seal, the seal is compressed inward to create good sealing contact with the inner surface 46d tapered section.

When nozzle piece 21 is assembled in recess 40 of nozzle body 24, a small gap 58, such as in the order of 0.001 inches, is present between the section 46c of the outer piece 46 and the mold 10. The gap can range from 0.0005 to 0.003 inches. Thus, when melt is injected into the cavity 16, the compressive force will force the melt to escape through gap 58 into spaces 62 and 64 as indicated by the arrows. The melt will act as an insulator between the nozzle and the mold in these spaces. The melt, however, is prevented from escaping into insulating air gaps 36 and 56 by annular seals 38 and 54, respectively. The proximity of section 46c to the mold prevents the melt in spaces 62 and 64 from re-entering the area 66 and possibly mixing with a new injection melt. This is significant as the melt in spaces 62 and 64 will degrade over time due to the continuous proximity to the hot nozzle 12 and the cooled mold 10. Thus, it is undesirable to have the melt from these spaces mix with virgin melt, or possibly a melt of a different color. Due to the shape of the outer piece 46, the area 66 from which old melt can mix with new melt is minimal.

The existence of gap 58 advantageously permits less precision when manufacturing nozzle piece 21, than would be necessary if, for example, the nozzle piece was dimensioned to contact the mold. As previously stated, the gap can range from 0.0005 to 0.003 inches. If manufactured to contact the mold, no such range would be permitted and the tolerances of the nozzle piece would be extremely low. The gap 58 is a "hot" gap, that is, the width of the gap will be in the desired range when the nozzle body and nozzle piece expand due to the heat. Thus, the temperature difference between the nozzle and the mold dictate how much the nozzle body and nozzle piece will expand, and the tolerances of the dimensions of the nozzle piece can be accordingly set.

Figure 3:
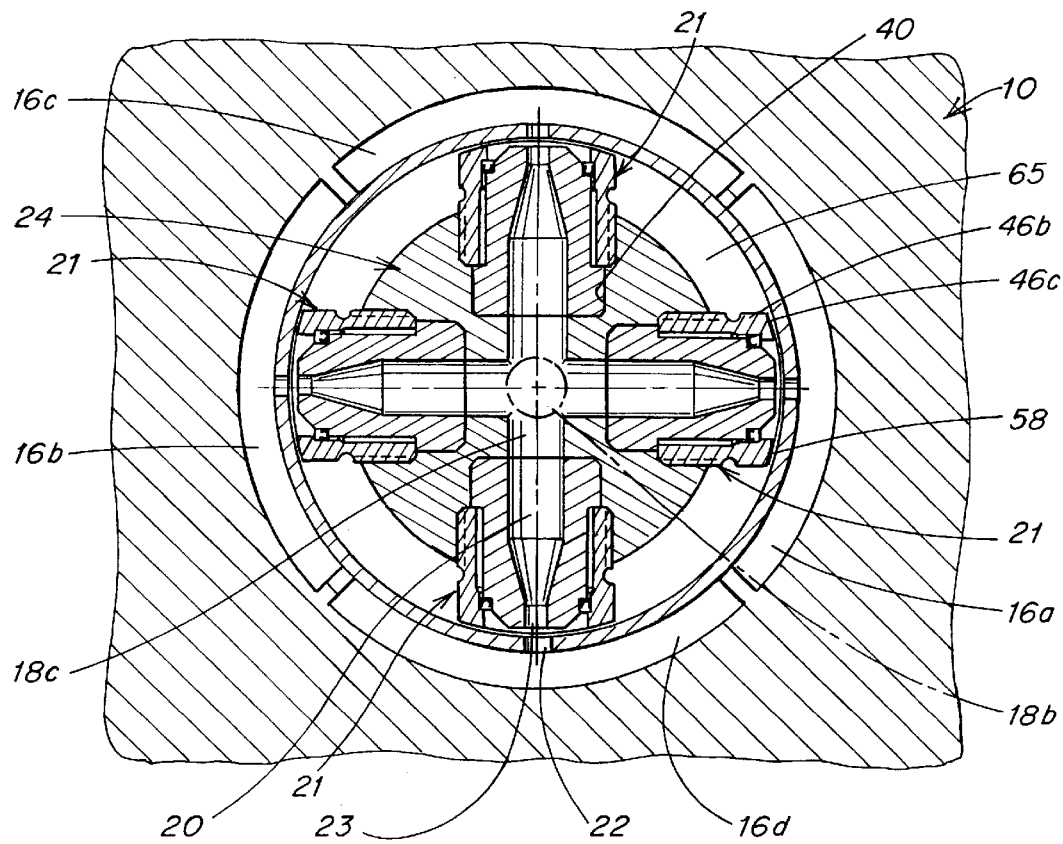
FIG. 3 is a cross-sectional view of the nozzle construction as taken along line 3—3 of FIG. 1.

FIG. 3 is a cross sectional view of the nozzle construction as taken along line 3—3 of FIG. 1. Four nozzle pieces 21 are shown in this embodiment. Bore section 18b is shown from which melt is distributed through radial passages 18c to bore passages 20 of the nozzle pieces. In operation, the melt proceeds out the opening 23 of the nozzle pieces, through the gate 22, and into the respective mold cavity 16a–16d. A space 65 is present between each nozzle piece 21. The space 65 will fill with melt that escapes through gap 58, in the same manner that spaces 62 and 64 of FIG. 2 fill with melt. Space 62 and 64, not shown in FIG. 3, are above and below the nozzle pieces 21, respectively. As in spaces 62 and 64, the melt again functions to insulate the nozzle body 24 from the mold. Gap 58 is uniformly distanced from the section 44c, to the mold 10. To achieve the uniform distance across the entire gap 58 the section 44c must be curved to adapt to the inner circumference of the mold 10.

Figure 4:
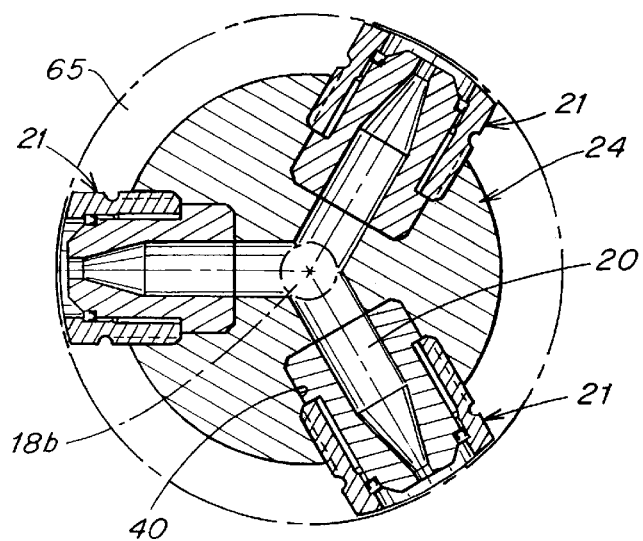
FIGS. 4–6 are cross-sectional views similar to that shown in FIG. 3 for but alternate embodiments using different numbers of nozzles.

FIG. 4 shows a cross sectional view similar to the cross-sectional view of FIG. 3, of an alternative nozzle construction as taken along the same lines as FIG. 3. The nozzle body 24 in FIG. 4 is formed with three recesses 40, as opposed to four in FIGS. 1–3, for receiving the nozzle pieces 21. Thus, melt is distributed from bore section 18b to three bore passages 20 of the nozzle pieces 21. The construction of the nozzle pieces 21 in FIG. 4 is the same as in FIGS. 1–3.

Figure 5:
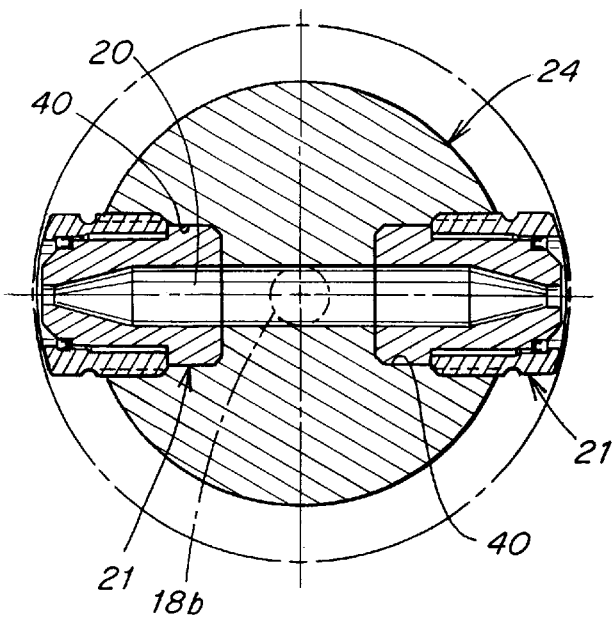

FIG. 5 shows a cross sectional view similar to the cross-sectional view of FIG. 3, of an alternative nozzle construction as taken along the same lines as FIG. 3. The nozzle body 24 in FIG. 5 is formed with two recesses 40, as opposed to four in FIGS. 1–3, or three in FIG. 4, for receiving the nozzle pieces 21. Thus, melt is distributed from bore section 18b to two bore passages 20 of the nozzle pieces 21. The construction of the nozzle pieces 21 in FIG. 4 is substantially the same as in FIGS. 1–3.

Figure 6:
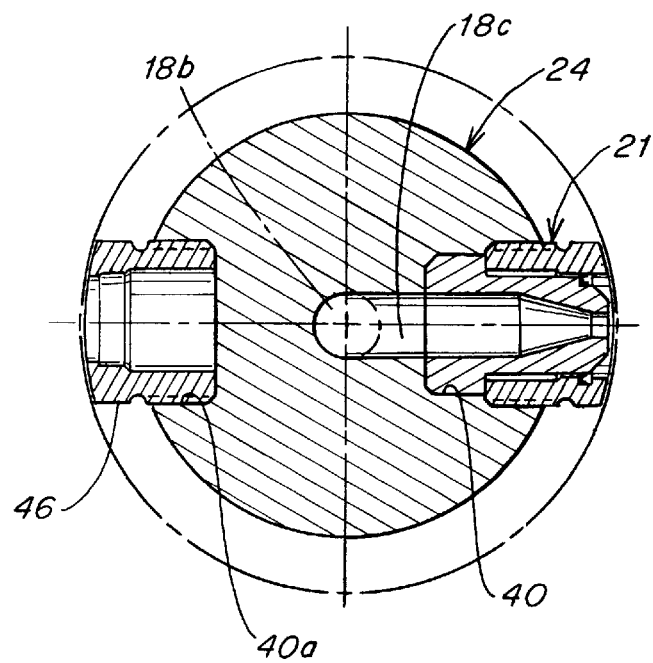

FIG. 6 shows a cross sectional view similar to the cross-sectional view of FIG. 3, of an alternative nozzle construction as taken along the same lines as FIG. 3. The nozzle body 24 in FIG. 4 is formed with two recesses 40, as opposed to four in FIGS. 1–3, or three in FIG. 4, for receiving the nozzle pieces 21. Although there are two recesses 40, only one bore section 18c of nozzle body 24 is formed to connect with one recess 40. Thus, bore section 18b distributes melt to only one bore passage 20 of the nozzle piece 21. The construction of the nozzle piece 21 in FIG. 4 is substantially the same as in FIGS. 1–3. Note, outer piece 46a is still screwed into recess 40a, in order to limit lateral deflection of the nozzle 12 which occurs when melt is shot out of single nozzle piece 21. Deflection is limited when the nozzle piece 40a contacts the mold. The configurations of FIGS. 3–5 do not have a nozzle deflection problem as the force of the melt shots are balanced off by one another. As there is only a single nozzle piece used in FIG. 6, the radial arrangement of the bore section 18c can be substituted with a vertical arrangement having a nozzle piece that points straight down, in line with the longitudinal axis of bore 18. Note, in this arrangement the nozzle piece 40a is not necessary, as there is no lateral deflection of the nozzle.

Figure 7:
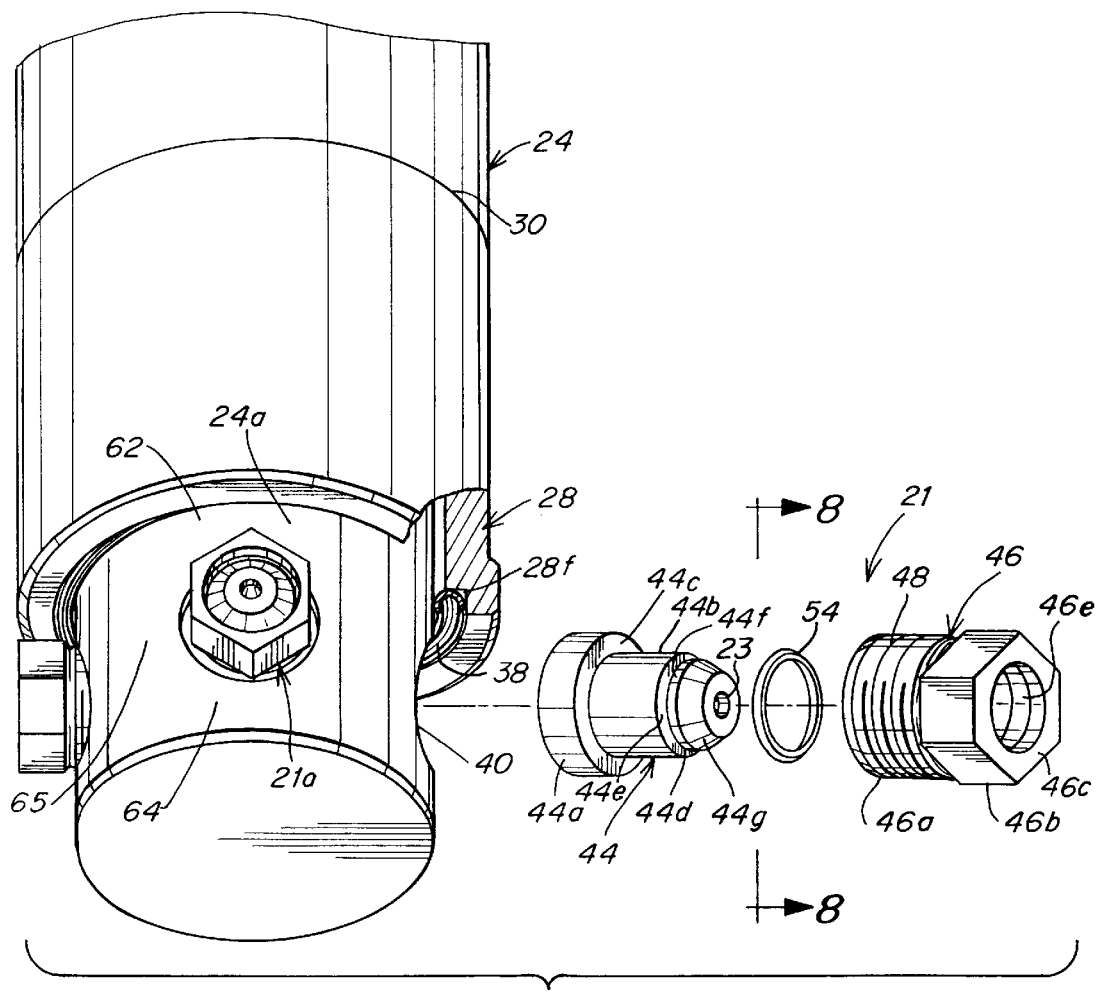
FIG. 7 is an exploded perspective view showing further details of the embodiment of FIG. 1.

FIG. 7 shows an exploded perspective view showing further details of the embodiment of FIG. 1. A cutaway of the nozzle member 28 and seal 38 are shown. The nozzle member 28 is constructed to be flush with the nozzle body 24 where the nozzle member meets the shoulder 30 formed by reduced diameter section 24a of the nozzle body 24. The spaces 62, 64 and 65 described in FIGS. 1–6 that surround the nozzle pieces 21 are clearly seen in FIG. 7. Also shown in FIG. 7 is an exploded perspective view of the nozzle piece 21. As stated above, inner piece 44 is to be seated in recess 40 of the nozzle body 24 and includes a first section 44a, a second section 44b having a lesser diameter than the first section to define a shoulder 44c on which the outer piece 46 rests. The seal 54 is compressibly fit over annular recess 44d in inner piece 44. The inner piece is tapered at 44f to opening 23. The outer piece 46 is shown with first end 46a that sits on shoulder 44c of the inner piece. Threads 48 are used to fixedly attach the outer nozzle piece to the nozzle body. Second end 46b can have a hexagonal shape to facilitate screwing the outer piece into the recess threads 49. The outer piece has a hollow area 46e to accept the inner piece 44. Nozzle piece 21a is shown in the assembled position attached to the nozzle body 24.

Figure 8:
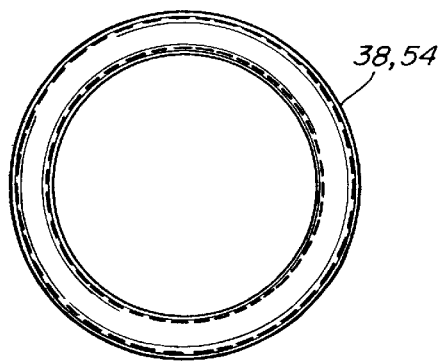
FIG. 8 is a plan view of a C-shaped sealing member used in the embodiment of FIG. 1.
Figure 9:
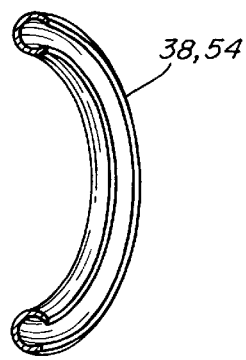
FIG. 9 is a cutaway perspective view showing further details of the sealing member of FIG. 8.

FIG. 8 is a plan view of the C-shape sealing member used in the embodiment of FIGS. 1–7 as taken along line 8—8 of FIG. 7. FIG. 9 is a cutaway perspective view showing further details of the sealing member of FIG. 8. FIGS. 8 and 9 represent the shape of both seals 38 and 54. When assembled, annular seals 54 and 38 are compressibly fit over inner piece 44 and nozzle body 24, respectively. The seal can be made of a resilient metallic material having low thermal conductivity. As seen in FIGS. 8 and 9, the seal has a C-shape, however, any seal of a shape that will minimize contact area with the nozzle body 24 and nozzle member 28 (for seal 38), and the inner and outer pieces of the nozzle piece 21 (for seal 54), is satisfactory.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding nozzle for disposition in a mold, said nozzle for injecting melt through a gate and into a cavity of the mold, said nozzle comprising:

a body having a through bore extending therethrough for receiving the melt, a nozzle piece secured to the body and defining an outlet for communicating between the body through bore and the cavity gate, the nozzle piece having an inner piece disposed in a recess formed in said nozzle body, and an outer piece fixedly attached to said nozzle body in said recess, wherein said outer piece surrounds said inner piece and holds said inner piece in place, and the nozzle piece is constructed and arranged so that there is an absence of any contact between said mold and said nozzle piece when said injection molding nozzle is disposed in said mold and melt is injected through the gate; and a nozzle member that surrounds said body at a position upstream of said nozzle piece and having an inner surface contacting the body, and an outer surface for contacting the mold, said outer surface for forming a seal against melt flow upstream from the nozzle member.

2. The injection molding nozzle of claim 1, further comprising:

a sealing member disposed between the nozzle body and the nozzle member at a position downstream of the inner surface of the nozzle member, said sealing member together with said nozzle body and said nozzle member defining a first insulating air gap that surrounds said nozzle body.

3. The injection molding nozzle of claim 2, wherein a second insulating air gap surrounds said nozzle body and said nozzle member upstream from said seal.

4. The injection molding nozzle of claim 3, wherein:

the inner piece is of a highly thermally conductive material; and the outer piece is of a less thermally conductive material than said inner piece.

5. The injection molding nozzle of claim 4, wherein said outer piece includes an end constructed and arranged, together with said mold, to form a gap that surrounds the gate of said cavity when melt is injected through the gate.

6. The injection molding nozzle of claim 1, wherein said nozzle piece comprises:

an inner piece of a highly thermally conductive material disposed in a recess formed in said nozzle body;

an outer piece of a less thermally conductive material than said inner piece fixedly attached to said nozzle body in said recess, wherein the outer piece surrounds said inner piece and holds said inner piece in place.

7. The injection molding nozzle of claim 6, wherein said outer piece includes an end constructed and arranged, together with said mold, to forms a gap that surrounds the gate of said cavity when melt is injected through the gate.

8. The injection molding nozzle of claim 7, wherein the width of said gap is within the range of 0.0005 to 0.003 inches.

9. The injection molding nozzle of claim 6, wherein the nozzle piece is secured radially to the nozzle body.

10. The injection molding nozzle of claim 1, wherein the nozzle piece is secured radially to the nozzle body.

11. An injection molding nozzle disposed in a mold, said nozzle for injecting melt through a gate and into a cavity of the mold, said nozzle comprising:

a body having a through bore extending therethrough for receiving the melt, a nozzle piece secured to the body and defining an outlet communicating between the body through bore and the cavity gate, the nozzle piece including:

an inner piece of a highly thermally conductive material disposed in a recess formed in said nozzle body;

an outer piece of a less thermally conductive material than said inner piece, fixedly attached to said nozzle body in said recess, wherein the outer piece surrounds said inner piece and holds said inner piece in place:

a nozzle member that surrounds said body at a position upstream of said nozzle piece and having an inner surface contacting the body, and an outer surface contacting the mold, said outer surface forming a seal against melt flow upstream from the nozzle member; and a sealing member disposed between the nozzle body and the nozzle member at a position downstream of the inner surface of the nozzle member, said sealing member together with said nozzle body and said nozzle member defining a first insulating air gap that surrounds said nozzle body;

wherein a second insulating air gap surrounds said nozzle body and said nozzle member upstream from said seal, and said outer piece includes an end that, together with said mold, forms a gap that surrounds the gate of said cavity; and wherein melt injected into said cavity from said nozzle piece will pass through the gap into a space, contacting said sealing member and said nozzle member.

12. The injection molding nozzle of claim 11, wherein said nozzle piece further comprises a sealing member disposed between the inner and outer piece that defines, together with said inner and outer pieces, an insulating air gap that surrounds the inner piece.

13. The injection molding nozzle of claim 12, wherein the outer piece includes threads for fixedly attaching said outer piece to the recess of the nozzle body.

14. The injection molding nozzle of claim 13, further comprising a plurality of nozzle pieces secured radially to the nozzle body.

15. The injection molding nozzle of claim 14, wherein the width of said gap is within the range of 0.0005 to 0.003 inches.

16. An injection molding nozzle disposed in a mold, said nozzle for injecting melt through a gate and into a cavity of the mold, said nozzle comprising:

a body having a through bore extending therethrough for receiving the melt, a nozzle piece secured to the body and defining an outlet communicating between the body through bore and the cavity gate, the nozzle piece including:

an inner piece of a highly thermally conductive material disposed in a recess formed in said nozzle body;

an outer piece of a less thermally conductive material than said inner piece, fixedly attached to said nozzle body in said recess, wherein the outer piece surrounds said inner piece and holds said inner piece in place; and a nozzle member that surrounds said body at a position upstream of said nozzle piece and having an inner surface contacting the body, and an outer surface contacting the mold, said outer surface forming a seal against melt flow upstream from the nozzle member;

wherein said outer piece includes an end that, together with said mold, forms a gap that surrounds the gate of said cavity, and wherein melt injected into said cavity from said nozzle piece will pass through the gap into a space, contacting said nozzle member.

17. The injection molding nozzle of claim 16, wherein the sealing member has a C-shape and melt in the space contacts an inner surface of the C-shape.

18. A nozzle piece for an injection molding nozzle for disposition in a mold, said nozzle piece to be secured to a body of the injection molding nozzle for injecting melt through a gate and into a cavity of the mold, said nozzle piece comprising:

an inner to be piece disposed in a recess formed in said nozzle body; and an outer piece to be fixedly attached to said nozzle body in said recess, wherein said outer piece is constructed and arranged to surround said inner piece and hold said inner piece in place in said nozzle body, and includes an end that is constructed and arranged, together with said mold, to define a gap that surrounds the gate of said cavity, so that there is an absence of any direct contact between said mold and said nozzle piece when the injection molding nozzle is disposed in the mold and melt is injected through the gate.

19. The nozzle piece of claim 18, in combination with an injection molding nozzle and a mold, wherein the nozzle piece is secured to the injection molding nozzle, and the injection molding nozzle is disposed in the mold, wherein the nozzle piece and the mold are constructed and arranged so that the width of said gap is within the range of 0.0005 to 0.003 inches.

20. The nozzle piece of claim 18, in combination with and secured to an injection molding nozzle.

21. The nozzle piece of claim 20, in further combination with a mold wherein the injection molding nozzle is disposed in the mold and the gap is defined between the end of the outer piece and the mold so that there is an absence of direct contact between the mold and nozzle piece when melt is injected through a gate of the mold.

22. The nozzle piece of claim 21, wherein melt injected into said cavity from said nozzle piece passes through the gap into a space defined by said mold and said injection molding nozzle.

23. A nozzle piece for an injection molding nozzle to be disposed in a mold, said nozzle piece to be secured to a body of the injection molding nozzle for injecting melt through a gate and into a cavity of the mold, said nozzle piece comprising:

an inner piece to be disposed in a recess formed in said nozzle body; and an outer piece to be fixedly attached to said nozzle body in said recess, wherein said outer piece is constructed and arranged to surround said inner piece and hold said inner piece in place in said nozzle body, and includes an end that is constructed and arranged, together with said mold, to define a gap that surrounds the gate of said cavity, wherein melt injected into said cavity from said nozzle piece will pass through the gap into a space contacting said mold and said outer piece.

24. The nozzle piece of claim 23, further comprising a sealing member to be disposed between said inner and outer pieces and to define, together with said inner and outer pieces, an insulating air gap that surrounds the inner piece.

25. The nozzle piece of claim 24, wherein the inner piece is made of a highly thermally conductive material, and the outer piece and sealing member are made of less thermally conductive material than said inner piece.

26. The nozzle piece of claim 25, in combination with an injection molding nozzle having a nozzle body, wherein the nozzle piece is secured radically to the nozzle body.

27. The nozzle piece of claim 26, wherein the outer piece includes threads for fixedly attaching the outer piece to the nozzle body.

28. The nozzle piece of claim 27, in combination with a molde, wherein the nozzle is constructed and arranged so that the width of said gap is within the range of 0.0005 to 0.003 inches.

29. The nozzle piece of claim 28, in combination with a plurality nozzle pieces secured radially to the nozzle body.

30. The nozzle piece of claim 23, further comprising a sealing member to be disposed between said inner and outer pieces and to define, together with said inner and outer pieces, an insulating air gap that surrounds the inner piece.

31. The nozzle piece of claim 30, wherein the sealing member has a C-shape.

32. The nozzle piece of claim 23, in combination with and secured to an injection molding nozzle.

33. The nozzle piece of claim 32, in further combination with a mold wherein the injection molding nozzle is disposed in the mold and the gap is defined between the mold and nozzle piece so that melt passes through the gap into a space between the injection molding nozzle and the mold when melt is injected through a gate of the mold.

34. A nozzle piece for an injection molding nozzle disposed in a mold, said nozzle piece to be secured to a body of the injection molding nozzle for injecting melt through a gate and into a cavity of the mold, said nozzle piece comprising:

an inner piece to be disposed in a recess formed in said nozzle body;

an outer piece to be fixedly attached to said nozzle body in said recess, wherein said outer piece is constructed and arranged to surround said inner piece, and hold said inner piece in place in said nozzle body; and a sealing member to be disposed between said inner and outer pieces and to define, together with said inner and outer pieces, an insulating air gap that surrounds the inner piece.

35. The nozzle piece of claim 34, wherein the outer piece includes an end that is constructed and arranged, together with said mold, to define a gap that surrounds the gate of said cavity.

36. The nozzle piece of claim 35, wherein the end of the outer piece is constructed and arranged so that a width of the gap is within the range of 0.0005 to 0.003 inches.

37. The nozzle piece of claim 35, in combination with a mold and an injection molding nozzle, wherein the nozzle piece is secured to the injection molding nozzle and the injection molding nozzle is disposed in the mold and the end of the outer piece extends past the inner piece toward the mold, to form the gap.

38. The nozzle piece of claim 34, in combination with and secured to an injection molding nozzle.

39. The nozzle piece of claim 38, in further combination with a mold wherein said injection molding nozzle is disposed in said mold.

40. The nozzle piece of claim 39, wherein there is an absence of contact between the nozzle piece and the mold when melt material is injected through the gate.

41. An injection molding nozzle for injecting melt material through a gate and into a cavity within a mold, the nozzle comprising:

a nozzle body having a through bore extending therethrough for receiving the melt material;

a nozzle piece secured to the nozzle body and defining an outlet for communicating between the nozzle body through bore and the gate, wherein the nozzle piece is constructed and arranged so that is an absence of direct contact between the nozzle piece and the mold;

a nozzle member that surrounds the nozzle body upstream the nozzle piece, the nozzle member being fixedly attached to the nozzle body, and adapted to contact and form a first seal with the mold to prevent melt material from passing into a first air space defined by the injection molding nozzle and the mold; and a sealing member that contacts the nozzle member and nozzle body for being mounted between the nozzle member and nozzle body, the sealing member adapted to form a second seal that prevents melt material from passing into a second air space defined by the nozzle body and the nozzle member.

42. The injection molding nozzle of claim 41, wherein the nozzle piece includes an end adapted to, together with said mold, define a gap that surrounds the gate of the cavity, wherein when melt is injected from said injection molding nozzle into the cavity, the melt passes through the gap into a space defined by an outer surface of the injection molding nozzle and the mold.

43. The injection molding nozzle of claim 41, wherein the nozzle piece includes an inner piece disposed in a recess formed in said nozzle body, and an outer piece fixedly attached to said nozzle body in said recess, wherein said outer piece surrounds said inner piece.

44. An injection molding nozzle for injecting melt material through a gate and into a cavity within a mold, the nozzle comprising:

a nozzle body having a through bore extending therethrough for receiving the melt material;

a nozzle piece secured to the body and defining an outlet for communicating between the nozzle body through bore and the gate, wherein the nozzle piece includes:

an inner piece disposed in a recess formed in said nozzle body; and an outer piece fixedly attached to said nozzle body in said recess, wherein said outer piece surrounds said inner piece and includes an end adapted to, together with said mold, define a gap that surrounds the gate of the cavity, wherein when melt is injected from said injection molding nozzle into the cavity, the melt passes through the gap into a space defined by an outer surface of the injection molding nozzle and the mold.

45. The injection molding nozzle of claim 44, further comprising a nozzle member that surrounds the nozzle body upstream of the nozzle piece, the nozzle member being fixedly attached to the nozzle body, and adapted to contact and form a first seal with the mold to prevent melt material from passing into a first air space defined by the injection molding nozzle and the mold.

46. The injection molding nozzle of claim 45, further comprising a sealing member that contacts the nozzle member and nozzle body for being mounted between the nozzle member and nozzle body, the sealing member adapted to form a second seal that prevents melt material from passing into a second air space defined by the nozzle body and the nozzle member.

47. An injection molding nozzle for injecting melt material through a gate and into a cavity within a mold, the nozzle comprising:

a nozzle body having a through bore extending therethrough for receiving the melt material; and a nozzle piece secured to the body defining an outlet for communicating between the nozzle body through bore and the gate, wherein the nozzle piece includes:

an inner piece disposed in a recess formed in said nozzle body; and an outer piece fixedly attached to said nozzle body in said recess, wherein said outer piece surrounds said inner piece and wherein the outer piece is constructed and arranged so that there is an absence of direct contact between said nozzle piece and said mold when melt material is injected through the gate.

48. The injection molding nozzle of claim 47, further comprising a nozzle member that surrounds the nozzle body upstream of the nozzle piece, the nozzle member being fixedly attached to the nozzle body, and adapted to contact and form a first seal with the mold to prevent melt material from passing into a first air space defined by the nozzle and the mold.

49. The injection molding nozzle of claim 48, further comprising a sealing member that contacts the nozzle member and nozzle body for being mounted between the nozzle member and the nozzle body, that forms a second seal along with the nozzle body and nozzle member and that prevents melt material from passing into a second air space defined by the nozzle body and the nozzle member.

50. The injection molding nozzle of claim 47, wherein the outer piece includes an end adapted to, together with said mold, define a gap that surrounds the gate of the cavity, wherein when melt is injected from said injection molding nozzle into the cavity, the melt passes through the gap into a space defined by an outer surface of the nozzle and the mold.

51. The injection molding nozzle of claim 47, in combination with a mold, wherein the injection molding nozzle is disposed the mold and there is absence of direct contact between the nozzle piece of the injection molding nozzle and the mold when melt material is injected through the gate.

52. An injection molding nozzle for injecting melt material through a gate and into a cavity within a mold, the nozzle comprising:

a nozzle body having a through bore extending therethrough for receiving the melt material;

a nozzle piece secured to the body defining an outlet for communicating between the nozzle body through bore and the gate, wherein the nozzle piece includes an end adapted to, together, with said mold, define a gap that surrounds the gate of the cavity, wherein when melt material is injected from said injection molding nozzle into the cavity, the melt passes through the gap into a space defined by an outer surface of the nozzle and the mold;

a nozzle member that surrounds the nozzle body upstream the nozzle piece, the nozzle member being fixedly attached to the nozzle body, and adapted to contact and form a first seal with the mold to prevent melt material from passing into a first air space defined by the nozzle and the mold; and a sealing member that contacts the nozzle member and nozzle body and is mounted between the nozzle member and the nozzle body, that forms a second seal with the nozzle body and nozzle member and that prevents melt material from passing into a second air space defined by the nozzle body and the nozzle member.

53. An injection molding nozzle for injecting melt material through a gate and into a cavity within a mold, the nozzle comprising:

a nozzle body having a through bore extending therethrough for receiving the melt material;

a nozzle piece secured to the body and defining an outlet communicating between the body nozzle though bore and the gate, wherein the nozzle piece includes:
 an inner portion having a through bore extending therethrough for receiving the melt material; and
 an outer portion having an end that extends past said inner portion toward the mold, said end adapted to, together with said mold, define a gap that surrounds the gate of the cavity, wherein when melt is injected from said injection molding nozzle into the cavity, the melt passes through the gap into a space defined by an outer surface of the injection molding nozzle and the mold.

54. The injection molding nozzle of claim 53, further comprising a nozzle member that surrounds the nozzle body upstream of the nozzle piece, the nozzle member being fixedly attached to the nozzle body, and adapted to contact and form a first seal with the mold to prevent melt material from passing into a first air space defined by the injection molding nozzle and the mold.

55. An injection molding nozzle for injecting melt material through a gate and into a cavity within a mold, the nozzle comprising:

a nozzle body having a through bore extending therethrough for receiving the melt material;

a nozzle piece secured to the body defining an outlet for communicating between the nozzle body through bore and the gate, wherein the nozzle piece includes:
 an inner portion having a through bore extending therethrough for receiving the melt material; and
 an outer portion including an end constructed and arranged to extend past said inner portion toward the mold and so that there is an absence of direct contact between said nozzle piece and said mold when melt material is injected through the gate.

56. The injection molding nozzle of claim 55, further comprising a nozzle member that surrounds the nozzle body upstream of the nozzle piece, the nozzle member being fixedly attached to the nozzle body, and adapted to contact and form a first seal with the mold to prevent melt material from passing into a first air space defined by the injection molding nozzle and the mold.

57. A nozzle piece for an injection molding nozzle to be disposed in a mold, said nozzle piece to be secured to a body of the injection molding nozzle for injecting melt through a gate and into a cavity of the mold, said nozzle piece comprising:

an inner piece to be disposed in a recess formed in said nozzle body; and an outer piece to be secured to said nozzle body, wherein said outer piece is constructed and arranged to surround and be coaxial with said inner piece, and hold said inner piece in place in said nozzle body, and includes an end that is constructed and arranged, together with said mold, to define a gap that surrounds gate of said cavity, and said outer piece is further constructed and arranged to be dimensioned relative to the mold to define a gap extending along the entire interface between the outer piece and the mold when melt is injected through the gate.

58. An injection molding nozzle for injecting melt material through a gate and into a cavity within a mold, the nozzle comprising:

a nozzle body having a through bore extending therethrough for receiving the melt material;

a nozzle piece secured to the nozzle body defining an outlet for communicating between the nozzle body through bore and the gate, the nozzle piece adapted to be dimensioned relative to the mold to define a gap extending along the entire interface between the nozzle piece and the mold when melt material is injected through the gate;

a nozzle member that surrounds the nozzle body, the nozzle member being supported about the nozzle body; and a sealing member supported by the nozzle member, the sealing member adapted to form a seal that prevents melt material from passing from a space defined by the nozzle body, mold and nozzle member.

59. An injection molding nozzle for injecting melt material through a gate and into a cavity within a mold, the nozzle comprising:

a nozzle body having a through bore extending therethrough for receiving the melt material;

a nozzle piece secured to the nozzle body defining an outlet for communicating between the nozzle body through bore and the gate, the nozzle piece having a gap defining face that is adapted to face a gap defining face of said mold, said nozzle piece face and said mold face defining said gap, said gap extending along the entire interface between the nozzle piece and the mold when melt material is injected through the gate;

a nozzle member that surrounds the nozzle body, the nozzle member being supported about the nozzle body; and a sealing member supported by the nozzle member, the sealing member adapted to form a seal that prevents melt material from passing from a space defined by the nozzle body, mold and nozzle member.

60. A nozzle piece for an injection molding nozzle to be disposed in a mold, said nozzle piece to be secured to a body of the injection molding nozzle for injecting melt through a gate and into a cavity of the mold, said nozzle piece comprising:

an inner piece to be secured to said nozzle body;

an outer piece to be secured to said nozzle body, wherein said outer piece is constructed and arranged to surround, and be coaxial with said inner piece; and a sealing member to be disposed between said inner and outer pieces and to define, together with said inner and outer pieces, an insulating air gap that surrounds the inner piece.

61. The nozzle piece of claim 60, wherein the outer piece includes a first end to contact a surface of the inner piece and to hold the inner piece in place.

62. The nozzle piece of claim 61, wherein the outer piece includes a second end adapted to define a gap with the mold that extends along an entire interface between the outer piece and the mold so that the outer piece does not contact the mold when melt material is injected through the gate.

* * * * *